United States Patent [19]
Simpson et al.

[11] Patent Number: 5,667,344
[45] Date of Patent: Sep. 16, 1997

[54] CVD DIAMOND CUTTING TOOLS WITH ORIENTED CRYSTAL GRAIN BOUNDARIES

[75] Inventors: Matthew A. Simpson, Sudbury; Robert A. Hay, Dudley, both of Mass.; Steven J. Brox, Ridgefield, Wash.

[73] Assignee: Saint-Gobain/Norton Industrial Ceramics Corp., Worcester, Mass.

[21] Appl. No.: 718,648

[22] Filed: Sep. 27, 1996

Related U.S. Application Data

[63] Continuation of Ser. No. 203,960, Mar. 1, 1994, abandoned.

[51] Int. Cl.$^6$ .................................................... B23B 27/20
[52] U.S. Cl. .................................................. 407/118; 408/145
[58] Field of Search ............................ 407/118, 119; 408/145; 76/DIG. 12

[56] References Cited

U.S. PATENT DOCUMENTS

| 2,711,892 | 6/1955 | Fulke | 407/118 |
| 3,745,623 | 7/1973 | Wentor | 407/119 |
| 5,139,372 | 8/1992 | Tanabe et al. | 407/118 |

*Primary Examiner*—Daniel W. Howell
*Assistant Examiner*—Kenneth J. Hansen
*Attorney, Agent, or Firm*—Volker R. Ulbrich

[57] ABSTRACT

A cutting tool of the type having a tool support with a cutting tip of CVD diamond film brazed to it has the diamond material so oriented that the general direction of grain boundaries is not normal to the general plane of the rake face.

22 Claims, 4 Drawing Sheets

CVD DIAMOND CUTTING TOOLS WITH ORIENTED CRYSTAL GRAIN BOUNDARIES

This application is a continuation of application Ser. No. 08/203,960 filed on Mar. 1, 1994 now abandoned.

The present invention was made with Government support, and the Government has certain rights in the invention.

FIELD OF THE INVENTION

The invention relates to cutting tools generally and relates more particularly to tools which use chemical vapor deposited (CVD) diamond film as a cutting element.

BACKGROUND OF THE INVENTION

Some cutting tools for special applications or for extended life generally are of a compound type, in which a very hard cutting element, or cutter, of one material is held in a holder of softer, base material. Such a compound arrangement is used for flat tools, such as cutting tools for lathes, and round tools, such as drill bits, reamers, and end mills. In each case, a cutting element is secured to the holder to present a cutting edge, a flank face, and a rake face to the workpiece to be machined. In the course of a cutting operation, the flank face is forced against and moves generally parallel to the workpiece surface. Examples of materials commonly used for cutters are tool steel, tungsten carbide, ceramic, sapphire, and diamond. Examples of materials commonly used as base material are steel, tungsten carbide, and ceramic. The flank face is generally considered to be the end face of a cutting tool which extends from the cutting edge in the general direction of the movement of the tool relative to the workpiece, with some deviation from this direction being provided for clearance purposes, however. The rake face is that face of the tool to the other side of the cutting edge from the flank face and is sometimes also referred to as the "cutting face."

For many applications diamond is considered to be the ultimate cutter material because of its extreme hardness and resistance to important types of chemical corrosion. The diamond may be in the form of diamond compact material, also referred to as polycrystalline diamond (PCD) made of diamond micro-crystallites held in a cobalt matrix. It may also be either natural or CVD diamond film, which are both even harder than PCD material and exhibit better performance for many applications because the cobalt binder of the PCD material increases the friction of the tool, reduces the chemical and thermal stability, and can also act as a contaminant for the Workpiece. Diamond film has an advantage over natural diamond for cutting tool applications in that it can be manufactured in geometries which are very difficult, if not impossible, to obtain with natural diamond. For example, it can be made in free-standing, polycrystalline, flat wafer form to be bonded to a holder as the cutter tip. It can also be deposited directly on the tool holder as either a thick film or a thin film. In this context a thin film is a film too thin to be free-standing and is usually on the order of about thirty microns or less in thickness.

Despite the outstanding properties of CVD diamond film for implementation as a cutter element, such material nevertheless does show wear after extensive use. The mechanism of failure is believed to be due to the generation on the rake face of tensile stresses which exceed the fracture strength of the diamond. As a result, the material breaks away at the flank face. Typically, this would happen when a hard lump in the workpiece material being cut hits the rake face very near the cutting edge, producing high local tensile stresses on the rake face generally in the plane of the rake face. At some flaw near the surface, these tensile stresses induce a crack which propagates downward and eventually breaks a small chip from the end of the tool.

SUMMARY OF THE INVENTION

In accordance with the present invention, a CVD diamond film cutting element is made so that the columnar grains are substantially non-normal to the rake face. This significantly improves the resistance of the cutting element to failure.

In diamond grown by CVD, the growth has a predominantly vertical columnar structure, with grain boundaries running generally normal to the growth substrate. These grain boundaries constitute a structurally weak feature of the resulting film. In such a CVD material the flaws are associated with grain boundaries, with the major dimensions of the flaws usually being in the direction of the columns. Tensile stresses normal to the major dimensions of the flaws are most likely to induce cracks. This failure is less likely to occur when the columnar grains are not normal to the rake face.

DETAILED DESCRIPTION

The tools discussed below are of the type having a cutter of CVD diamond material secured to a support of some sort, such as a tool holder or a tool insert to be mounted on a tool holder. The support is made of some base material, which may be a metal, ceramic, metal composite or other material suitable for such function for the intended application. The manner of securing the cutting tip can be any means providing sufficient stability. As a practical matter, the diamond should be at least about 30 microns (micro-meters) thick in order to be able to be safely handled without danger of breakage. More commonly, it is on the order of hundreds of microns thick. A particularly effective manner of securing diamond to a support is by brazing with a commercially available reactive braze having a metal composition by weight of 74% silver, 24% copper, and 2% titanium and available, for example, from the Handy and Harmon Company of New York, U.S.A. The cutting tip of each tool has a cutting edge and a flank face, with the flank face extending generally along the direction of relative motion between the cutting edge and the workpiece in the use of the tool. However, it is noted that the flank face may not extend precisely in this direction because it may have a significant clearance angle. Likewise, the rake face may not be precisely normal to the workpiece surface, due to the provision of a rake angle.

The growth of CVD diamond in vertical columns, columns having a general direction normal to the growth substrate surface, is known in the art and is discussed, for example, in "Crystal Growth by DC Plasma Jet CVD" by Ken-Ichi Sasaki et al, in *Proceedings of the Second International Conference of New Diamond Science and Technology,* 1990, pp. 485–490. The diamond grains and grain boundaries which make up the columns are somewhat irregular in their direction. However, a visual inspection of a cross-section of the diamond film clearly reveals that there is a general direction to these features. A more empirical determination of this general direction could be made by identifying the directions of the longest included line segments for the crystal grains of a representative sample and finding their directional vector sum. However, those skilled in the art typically rely on visual means for determining the general direction of such crystal features. Use of the material for cutting tip purposes would logically suggest forming cutter element slabs by cutting it in a direction normal (perpendicular) to the faces, for mounting to a support in much the same way in which cutting tips of other materials, such as tungsten carbide, are mounted. However, this would result in a grain boundary orientation for which the cutting force is along the grain boundaries and would thereby reduce the ability of the cutter element to resist the pulling away of individual crystallites or groups of crystallites from the flank face of the cutter element during cutting.

Figure 1:
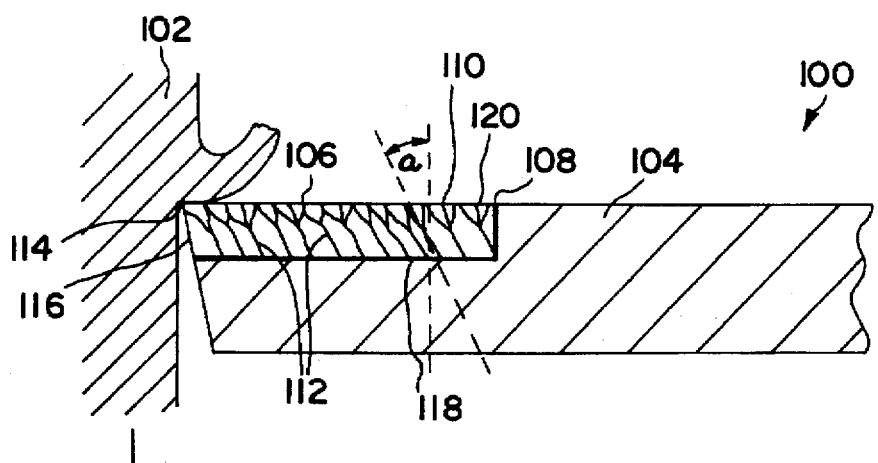
FIG. 1 is a front plan view a novel flat cutting tool in accordance with the present invention showing a diamond cutter element secured to a support and in the act of cutting a workpiece.

The FIG. 1 shows a novel flat cutting tool 100 in accordance with one embodiment of the invention in the process of cutting a workpiece 102. The cutting tool 100 includes a tip support 104 of base material, such as tungsten carbide. A cutting tip 106 in the form of a slab of diamond film is secured to the tip support 104 by means of a reactive braze 108 such as described above. The orientation of the tip 106 relative to the support 104 is the opposite of the orientation of the diamond film to the substrate on which it was deposited. That is, the face of the tip 106 slab which was the growth surface during deposition is the exposed rake face surface 110. It has been found that with certain growth conditions it is possible to obtain diamond film in which the columnar growth is non-normal to the growth substrate surface. This makes it possible to grow diamond film so that in the fragment of a cutting tip 106 as shown in FIG. 1, the grain boundaries 112 lean in a preferred direction away from a direction normal to its upper and lower faces 118, 120. The conditions for making such diamond film with non-normal grain boundaries are known and are also described, for example in above-cited technical publication "Crystal Growth by D.C. Plasma CVD," by K. Sasaki et al. The grain boundaries 112 of the tip 106 are shown to be oriented along a general direction which is a non-zero angle "a" with respect to a line normal to the general plane of the rake face.

The term "general direction" of a feature is intended to mean that direction most closely approximating the vector sum of the individual directions of the features involved, which in this case are the grain boundaries. The term "general plane" of a surface is intended to mean a plane which most closely approximates the location of all the points on the surface, which in this case is the rake face surface. The tool 100 is unlike prior art tools of such a type, in which the general direction of the grain boundaries would be along the thickness dimension of the tip 106, normal to the major surfaces of the tool and generally parallel to a line normal to the general plane of the rake face. For such a prior art tool the angle "a" would be zero.

Figure 2:
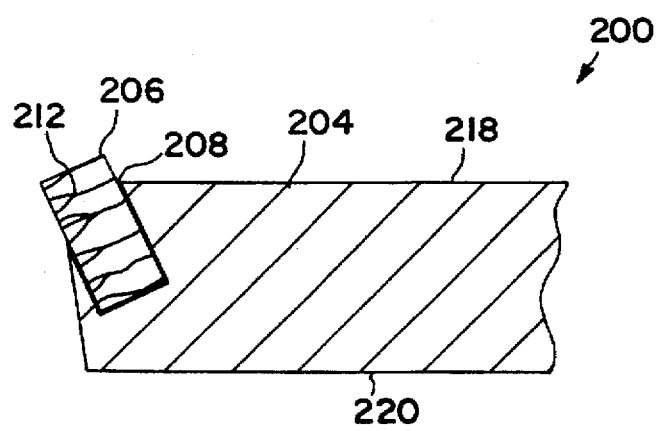
FIG. 2 is a front plan view a novel flat cutting tool in accordance with another embodiment of the present invention showing a diamond cutter element secured to a support, but not yet trimmed.
Figure 3:
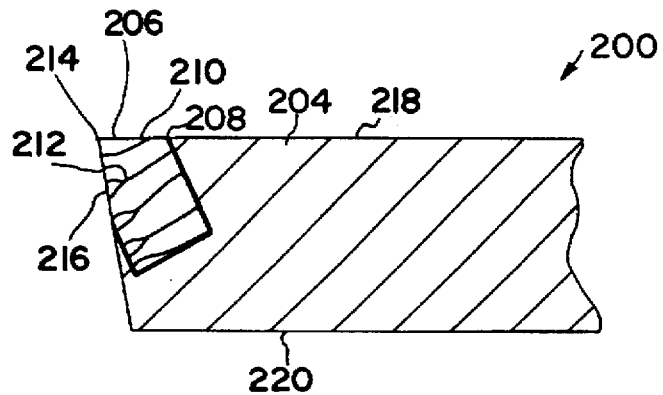
FIG. 3 is a front plan view of the tool of FIG. 2 after the diamond cutter element has been trimmed.

In the FIG. 2 there is shown a flat cutting tool 200 in accordance with another embodiment of the invention having a tip support 204 in which a cutting tip 206 made of a slab of CVD diamond film about 1 mm (millimeter) thick is secured to a tip support 204 by a reactive braze 208. Instead of being oriented as a slab parallel to the major surfaces 218, 220 of the support 204, the tip 206 is disposed at a steep angle to the major surfaces, so that the grain boundaries 212 of the tip 206 are far from normal to the general planes of the major surfaces 218, 220. This permits the angle "a" of the grain orientation to be greater than that of the tool 100 of FIG. 1, since that angle is not entirely dependent upon the growth process for the diamond. The growth process provides for only a limited deviation from normal direction. The tip 206 of the tool 200 of FIG. 2 is trimmed by means of a laser and/or grinding or honing with diamond abrasive or other means to form a cutting edge 214 as shown in FIG. 3. It can be seen that for the tool 200, the tensile forces generally along the rake face 210 are now not at all along the grain boundaries 212 of the tip 206, but rather are nearly normal to them. This significantly reduces even more than for the tool 100 of FIG. 1 the tendency of the tip 206 to become degraded by fracturing at the cutting edge 214 and flank face 216.

Figure 4:
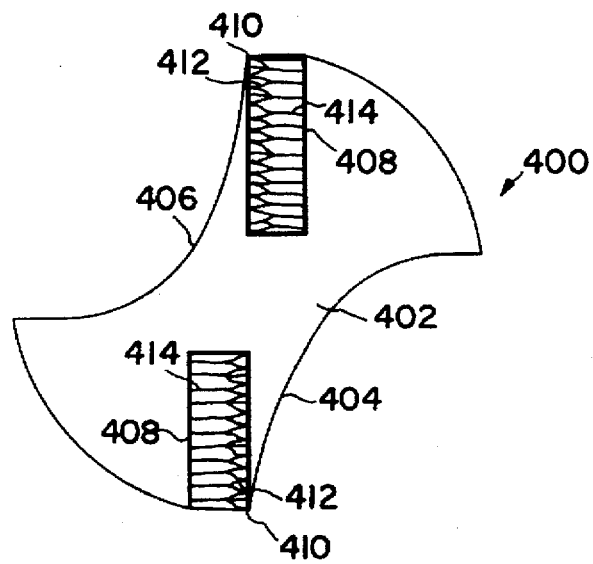
FIG. 4 is a schematic section of a prior art straight flute end mill.

In FIG. 4 there is shown a cross-section of a prior art round tool in the form of an end mill 400 having a fluted tool body 402 with flutes 404, 406, into each of which there are brazed one or more axially-extending segments of diamond film cutting tips 408 with cutting edges 410 and rake faces 412. By "round tool" is meant a tool, such as a drill bit or milling head, which cuts by rotating and therefore has an axis of rotation and may or may not be fluted. If the tool is fluted, the flutes may be straight or helical. In the tool 400 the grain boundaries 414 of the tips 408 are aligned generally along the thickness direction of the diamond film slab which forms the tips 408 and are therefore also normal to the general plane of the rake face 412 near the cutting edge 410, so that they are subjected directly to the tensile forces at the rake face 412. This orientation of the grain boundaries 414 leads to early failure of the tool, especially since the cutters of an end mill suffer an impact for every revolution of the tool 400.

Figure 5:
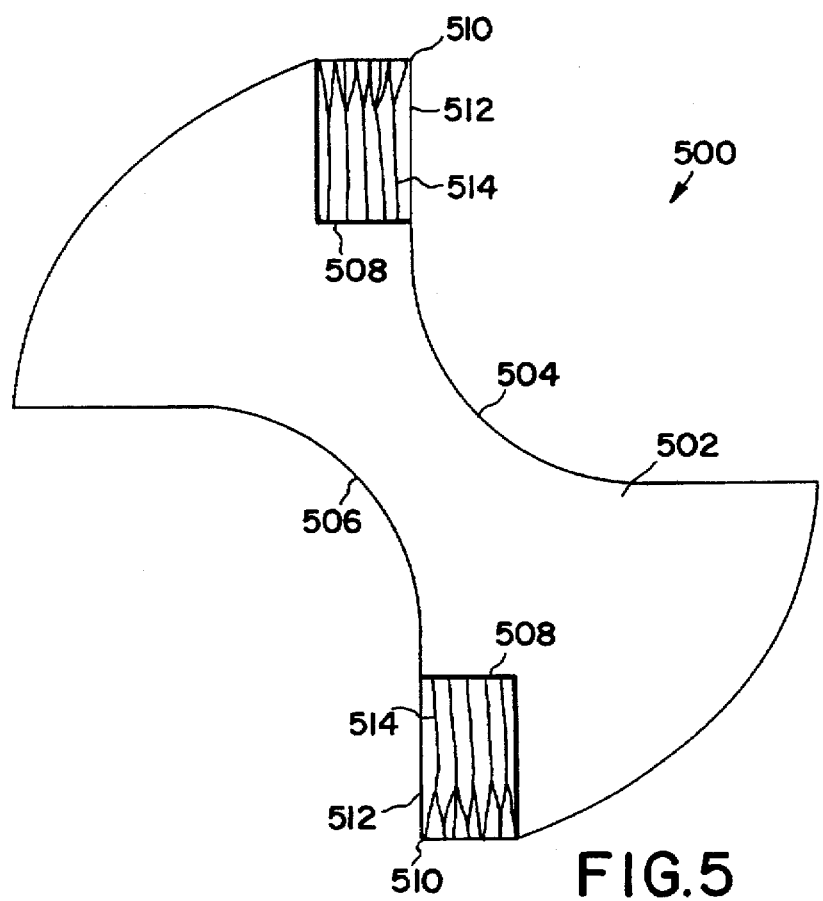
FIG. 5 is a schematic, sectioned end view of a novel straight-fluted end mill in accordance with the present invention.

The FIG. 5 shows a round tool in accordance with the present invention in the form of an end mill 500 having a fluted tool body 502 with flutes 504, 506. Into each of the flutes 504,506 a cutting tip 508 is secured by brazing. The cutting tips 508 with cutting edges 510 are cut from an extra thick diamond film about 1.5 mm thick by slicing across the thickness of the film and along the grain boundaries 514, so that they can be secured to a shoulder on the flutes 504, 506 with their grain boundaries 514 generally parallel to the rake faces 512 of the tips 508. This arrangement substantially improves the ruggedness of the tool 500 over that of the prior art tool 400 of FIG. 4. For applications in which the tool is subjected to high shear forces, it may be desirable to anchor the cutting tips 508 in a channel, such as is described in copending application Ser. No. 07/848,617 filed Oct. 8, 1993 entitled Diamond Film Cutting Tool and assigned to the same assignee as is the present invention.

Figure 6:
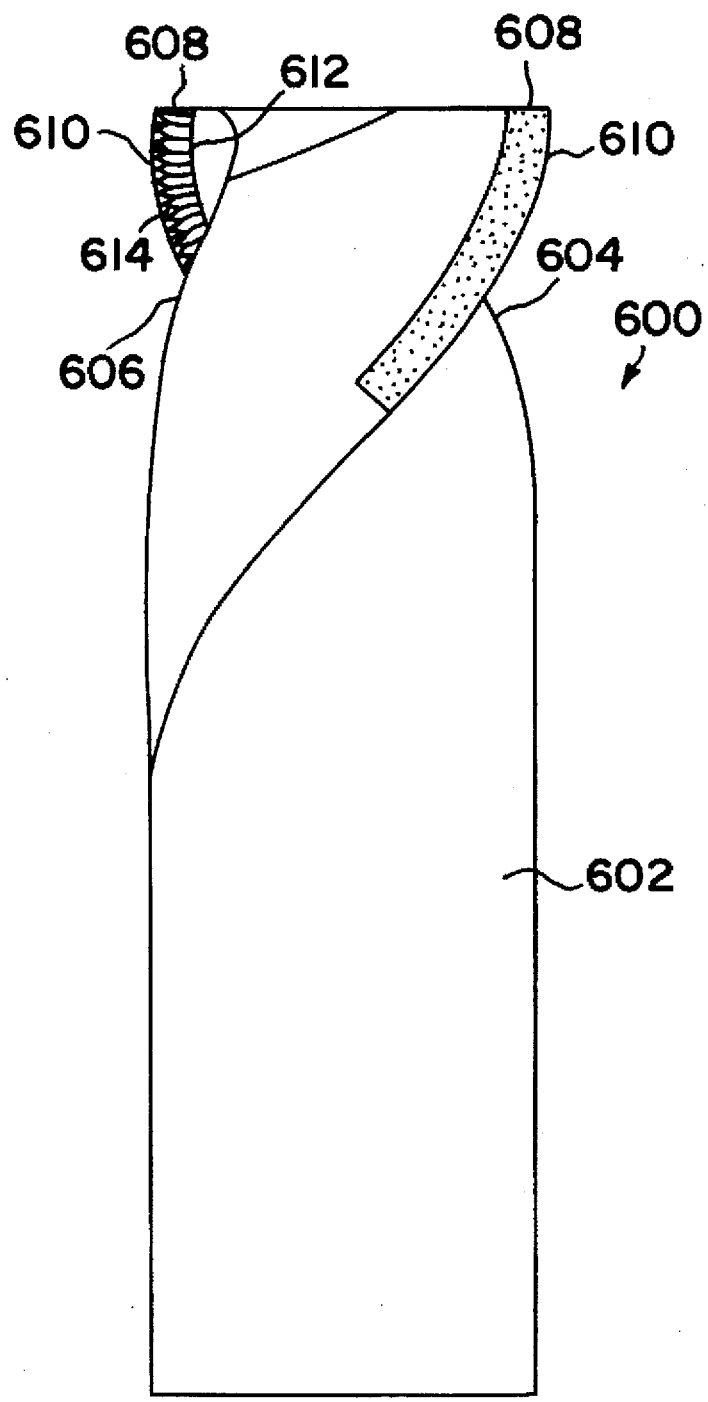
FIG. 6 is an exaggerated, schematic plan view of a helical flute end mill in accordance with the present invention.

The FIG. 6 illustrates another round tool 600 in accordance with the present invention. The tool 600 is also an end mill and has a structure similar to that of the end mill 500 with a tool body 602 having flutes 608, but in this case with the flutes 608 being helical. Helical cutting tips 608 with cutting edges 610 are brazed onto shoulders at the outside edges of the flutes 608 with rake faces 612 of exposed diamond film near the outside edges of the flutes 608. The cutting tips 608 are oriented with their grain boundaries 614 parallel to the rake faces 612 to provide improved ruggedness.

Figure 7:
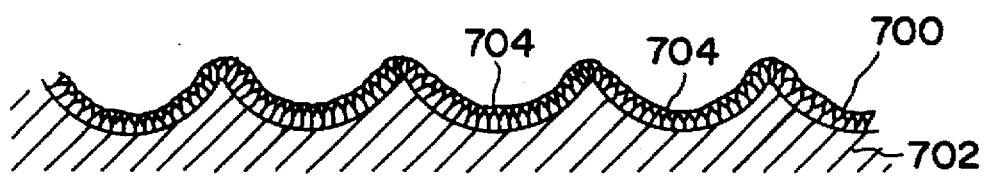
FIG. 7 is a sectioned, schematic illustration of one way of providing diamond film specifically suited for serving as the helical cutter element of the end mill of FIG. 6. The diamond is deposited on a channeled substrate as viewed along the channels
Figure 8:
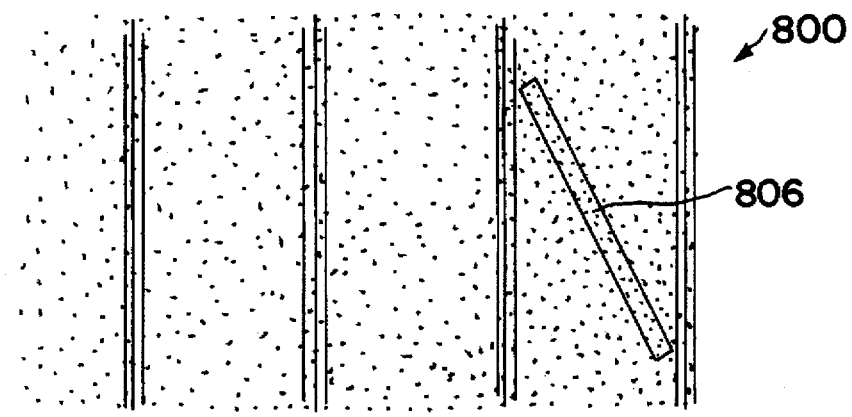
FIG. 8 is a schematic plan view of the diamond of FIG. 7 showing how the cutter piece is to be cut from the deposited diamond.

The cutting tips 608 of the tool 600 of FIG. 6 can be made by a novel method which will be described with reference to the FIGS. 7 and 8. In FIG. 7 there is shown a cross-section of a diamond film 700 deposited by CVD on a deposition substrate 702 with a substrate surface which is configured to have one or more shallow longitudinal channels 704, the cross-sectional contour of which has a constant radius of curvature "r". When the diamond 700 is removed from the substrate 702, it features a type of "washboard" topography. The FIG. 8 plan view of the diamond 800 shows how an elongated cutting tip piece 806 can be cut from the diamond film 800 so that it will have the helical geometry required for the tool 600 of FIG. 6. The helical cutting tip 806 is secured by brazing to shoulders or channels in the flutes 608 of the end mill 610 as shown in FIG. 6.

Figure 9:
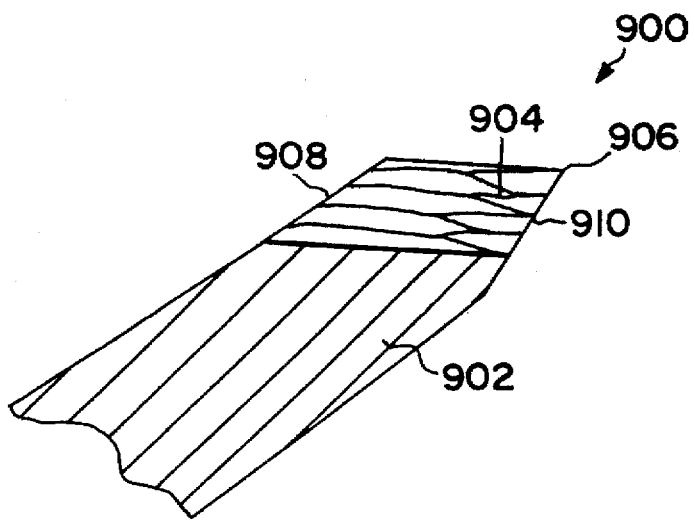
FIG. 9 is a sectioned side view of the cutting end fragment of a diamond film knife blade in accordance with the present invention.

In yet another embodiment of the invention shown in FIG. 9, a knife 900, such as an industrial parting knife for paper or plastic, includes a base material support 902 to which is brazed a cutting tip 904 in a wedge shape with a cutting edge 906 along the narrow end and two side faces 908, 910. The grain boundaries 912 of the cutting tip 904 are oriented longitudinally as nearly as feasible along the wedge toward the cutting edge 906. In this case, either of the side faces 908, 910 of the wedge could be regarded as the rake face, so the grain boundaries 912 are substantially non-normal to both faces 908, 910. The cutting tip 904 can be made in a manner similar to that for making the cutting tip 106 of the tool 100 of FIG. 1 by growing the diamond so that the grain boundaries are non-vertical to the growth substrate. Alternatively, a slice of a relatively thick diamond film slab can be cut to the desired geometry of the cutting tip 904 with attention to the orientation of the grain boundaries. While any orientation of the grain boundaries which would be non-normal to either of the rake faces would be an improvement over one which is normal to either rake face, it is likely that the optimum orientation of the grain boundaries would be in a direction along a line which bisects the angle between the two rake faces.

While for the above-described examples of tools the orientation of the grain boundaries was largely uniform throughout the cutting element, it would also be within the scope of the invention for the grain boundary orientation of the cutter in a region near and including the cutting edge to be non-normal to the rake face, while for the remainder of the cutting element the orientation is different, such as normal to the rake face or non-normal to it in a different direction. Such a cutter element could be made by changing the growth conditions in the course of the growth of the cutter element to change the grain boundary orientation at some point in the thickness and to then cut the cutter element so that the non-normal grain boundary portion of the diamond is presented at the cutting edge.

We claim:

1. A cutting tool comprising a polycrystalline diamond cutting member having a cutting edge and having a flank face and a rake face, the rake face being in a general plane extending from the cutting edge, the cutting member having crystal grain boundaries formed as deposited film columnar structures extending at least in a region near the cutting edge in a general direction which is non-normal to the general plane of the rake face.

2. The cutting tool of claim 1 wherein the cutting member is of chemical vapor deposited diamond.

3. The cutting tool of claim 2 wherein the cutting member is at least about 50 microns thick.

4. The cutting tool of claim 3 wherein the cutting member is a slab having two opposed and parallel slab faces and in which the grain boundaries have a preferred direction generally parallel to its support faces.

5. The cutting tool of claim 4 wherein the cutting member is secured to the perimeter portion of a round tool support so that a thickness dimension surface of the cutting element is exposed at the perimeter surface of the round tool as a flank face extending from the cutting edge.

6. The cutting tool of claim 5 wherein the round tool support is fluted.

7. The cutting tool of claim 6 wherein a face of the cutting member is coextensive with a portion of the flute surface.

8. The cutting tool of claim 7 wherein the round tool is an end mill.

9. The cutting tool of claim 3 wherein the cutting member is elongated and spiral-shaped.

10. The cutting tool of claim 9 wherein the cutting member has grain boundaries with a preferred direction generally normal to its faces.

11. The cutting tool of claim 10 wherein the cutting member has grain boundaries with a general direction generally normal to its faces at any given point along its length.

12. The cutting tool of claim 11 comprising a helically fluted round tool to which the cutting member is secured at the outer perimeter of a flute.

13. The cutting tool of claim 12 wherein the round tool is a drill bit.

14. The cutting tool of claim 12 wherein the round tool is an end mill.

15. The cutting tool of claim 3 wherein the cutting edge is the pointed end of a wedge to form a knife edge.

16. The cutting tool of claim 15 wherein the cutting member is secured to a surface of a knife support.

17. The cutting tool of claim 3 wherein the cutting tool is flat and comprises a cutting member support with generally mutually parallel first and second support faces and wherein the cutting member is secured to the support at the first support face, the cutting member comprising a slab of diamond film with first and second major slab faces, the cutting member being secured to the support in a channel extending into the support at the first support face toward the second support face at an angle to the first support face such that the direction of the grain boundaries of the cutting member are substantially non-parallel to a direction normal to the first support face.

18. The cutting tool of claim 17 wherein the diamond cutting member is finished to have a cutting edge from which the rake face extends over a portion of its surface.

19. The cutting tool of claim 18 wherein the cutting member is finished to have a rake face extending from its cutting edge in a direction generally parallel to the faces of the support.

20. The cutting tool of claim 3 wherein the general direction of the grain boundaries of the cutting member is substantially non-normal to the flank and rake faces of the cutting member.

21. The cutting tool of claim 20 wherein the cutting tool is flat and comprises a cutting member support with generally mutually parallel first and second support faces and wherein the cutting member is secured to the support in a shoulder extending to an edge of the support so that one face of the cutting member is the rake face generally parallel with one face of the support and so that the flank face of the cutting member is formed by an exposed surface across its thickness at the edge of the support, the cutting member having grain boundaries which have a preferred direction substantially non-normal to the rake face.

22. The cutting tool of claim 21 wherein the grain boundaries have a preferred direction away from normal to the faces of the cutting member and toward the cutting edge.

* * * * *